United States Patent
Bartminn et al.

(10) Patent No.: US 10,738,765 B2
(45) Date of Patent: Aug. 11, 2020

(54) OFFSHORE WIND TURBINE

(71) Applicant: innogy SE, Essen (DE)

(72) Inventors: Daniel Bartminn, Elmshorn (DE); Joerg Johannes Weber, Ribnitz-Damgarten (DE); Bernadette Zipfel, Hamburg (DE); Oliver Heinrich, Hamburg (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 16/338,047

(22) PCT Filed: Sep. 29, 2017

(86) PCT No.: PCT/EP2017/074833
§ 371 (c)(1),
(2) Date: Mar. 29, 2019

(87) PCT Pub. No.: WO2018/060455
PCT Pub. Date: Apr. 5, 2018

(65) Prior Publication Data
US 2019/0234379 A1  Aug. 1, 2019

(30) Foreign Application Priority Data

Sep. 30, 2016 (DE) .......................... 10 2016 219 087

(51) Int. Cl.
*F03D 13/25* (2016.01)
*E02B 17/00* (2006.01)
(Continued)

(52) U.S. Cl.
CPC ............ *F03D 13/25* (2016.05); *B66C 23/207* (2013.01); *E02B 17/0034* (2013.01);
(Continued)

(58) Field of Classification Search
CPC .......... F03D 80/50; F03D 13/25; F03D 80/88; F03D 80/00; E02B 2017/0091;
(Continued)

(56) References Cited

U.S. PATENT DOCUMENTS

2015/0316024 A1* 11/2015 Larsen ................... B65G 47/04
414/564

FOREIGN PATENT DOCUMENTS

DE   102007020483   10/2008
TW   M316313        8/2007

OTHER PUBLICATIONS

English translation of International Search Report from corresponding PCT Appln. No. PCT/EP2017/074833, dated Nov. 17, 2017.

* cited by examiner

*Primary Examiner* — Carib A Oquendo
(74) *Attorney, Agent, or Firm* — Grossman, Tucker, Perreault & Pfleger, PLLC

(57) ABSTRACT

An offshore wind turbine, having a supporting structure, having a nacelle, having a rotor, having an interior space, having at least one access opening, and having a means of ascent, such as a ladder, a staircase or the like, wherein the supporting structure has a tower and a foundation structure, wherein the tower supports the nacelle and the rotor, wherein the access opening is configured as an access for people to the interior space, wherein the means of ascent is arranged in the interior space, wherein the means of ascent is assigned to the access opening, and wherein no external work platform is arranged between the foundation structure and the access opening, as viewed along a vertical extent of the supporting structure.

11 Claims, 6 Drawing Sheets

(51) Int. Cl.
  *E02B 17/02* (2006.01)
  *F03D 80/00* (2016.01)
  *B66C 23/20* (2006.01)
  *F03D 80/80* (2016.01)

(52) U.S. Cl.
  CPC .......... *E02B 17/027* (2013.01); *F03D 80/00* (2016.05); *F03D 80/88* (2016.05); *E02B 2017/0065* (2013.01); *E02B 2017/0091* (2013.01); *F05B 2240/95* (2013.01); *Y02E 10/726* (2013.01); *Y02E 10/727* (2013.01)

(58) Field of Classification Search
  CPC .......... E02B 17/027; E02B 2017/0065; E02B 17/0034; F05B 2240/95; F05B 2230/61; Y02E 10/727; B66C 23/207
  See application file for complete search history.

OFFSHORE WIND TURBINE

FIELD

The invention relates to an offshore wind turbine.

BACKGROUND

Offshore wind turbines customarily have an external work platform which can be reached via likewise external access ladders and intermediate platforms. The work platform and the access ladders and intermediate platforms are therefore fastened on the circumference of a tower or a transition piece of the offshore wind turbine. The external work platform is generally arranged above the 50 year wave height, i.e., in the north sea or Baltic, for example, approx. 15 m to 20 m above the lowest tidal water level "LTW", also known under the abbreviation "LAT" for "Lowest Astronomical Tide". An access opening in the region of the work platform permits access for people to the tower interior.

The external work platform arranged above the 50 year wave height, the access ladders and the intermediate platforms have an influence both on the overall height of the offshore wind turbine and on the dimensioning of the tower structure and foundation structure. The lower passage of the rotor blade tips of the rotor of the offshore wind turbine has to be arranged above the work platform and the structures and attachments located thereon, such as work cranes, walkways or the like. The height of the external work platform therefore indirectly also determines the hub height of the rotor. Furthermore, the access ladders and intermediate platforms cause considerable wave resistance.

SUMMARY

The invention is therefore based on the technical problem of specifying an improved offshore wind turbine which does not have the above-described disadvantages or at least has them to a lower extent and in particular permits a lower overall height.

The invention relates to an offshore wind turbine, having a supporting structure, having a nacelle, having a rotor, having an interior space, having at least one access opening, and having a means of ascent, such as a ladder, a staircase or the like, wherein the supporting structure has a tower and a foundation structure, wherein the tower supports the nacelle and the rotor, wherein the access opening is configured as an access for people to the interior space, wherein the means of ascent is arranged in the interior space, wherein the means of ascent is assigned to the access opening, and wherein no external work platform is arranged between the foundation structure and the access opening, as viewed along a vertical extent of the supporting structure By means of the internal means of ascent, the wave resistance can be reduced in comparison to an external arrangement. The internal means of ascent does not have to be configured for wave loads. The foundation structure can be configured for smaller loads and can be dimensioned more compactly.

The omission of an external work platform below the access opening makes it possible to reduce the overall height of the offshore wind turbine as a whole since, in the completely assembled state of the wind turbine, the rotor and hub can be arranged lower, i.e. at a smaller distance from the water surface.

When a work platform is discussed here, this is in particular a service platform which is provided for loading big bags, containers having a tool or service appliances from a service boat for the wind turbine. Furthermore, relatively large replacement parts or components of the wind turbine can also be provided via the work platform, for example during construction, operation or maintenance.

"No external work platform" means here that no work platform is arranged on the circumference of the supporting structure. In particular, no work platform is arranged on an outer surface of the supporting structure that faces away from the interior space, i.e. is arranged on an outer circumferential surface of the supporting structure that faces away from the interior space.

In particular, no work platform which has a lifting device, such as a crane or the like, and/or a walkway, is arranged between the foundation structure and the access opening, as viewed along a vertical extent of the supporting structure.

In particular, no work platform which has a lifting device, such as a crane or the like, and/or a walkway, where the walkway surrounds, orbits or encloses the circumference of the tower, is arranged between the foundation structure and the access opening, as viewed along a vertical extent of the supporting structure.

When a vertical extent of the supporting structure is discussed here, in the completely assembled state of the wind turbine, the vertical extent extends substantially parallel to the vertical.

The foundation structure can be one of the following designs: "monopile", "tripod", "jacket", "suction pile" or "heavy-weight foundation".

Two or more access openings can be provided.

The two or more access openings can be arranged at a distance from one another, as viewed along a vertical extent of the supporting structure.

The two or more access openings can be arranged at an angular distance from one another on the circumference of the supporting structure.

According to a further refinement, the offshore wind turbine has a lifting device and a loading opening, wherein the lifting device and the loading opening are arranged between the access opening and the nacelle, as viewed along the vertical extent, wherein the lifting device is assigned to the loading opening, wherein the lifting device is movable from a first into a second position, wherein, in the first position, the lifting device is accommodated at least in sections in the interior space, and wherein, in the second position, the lifting device is extended in the region of the loading opening so as to project at least in sections over an outer circumferential surface of the supporting structure. The lifting device can thus be protected from weather conditions.

"Movable" means here that the lifting device can be extendible, pivotable, displaceable or unfoldable.

The lifting device can be a crane. The lifting device can have a cable winch or a crane winch.

The lifting device can have one or more movable supports, such as steel supports, steel profiles or the like, which are fastened to the supporting structure by one or more joints and/or by one or more guide rails.

According to a further refinement of the offshore wind turbine, in the first position, the lifting device is completely accommodated in the interior space. The lifting device can thus be protected from weather conditions.

The means of ascent can be arranged completely in the tower interior space from the access opening as far as the nacelle.

According to a further refinement of the offshore wind turbine, it is provided that the lifting device has a trolley and a cantilever, wherein the trolley is provided in particular for the mounting of a hoist and/or of loads and is displaceable along the cantilever, and wherein the cantilever is movable in particular at least in sections out of the interior space, and therefore the cantilever is extended so as to project at least in sections over an outer circumferential surface of the supporting structure. The lifting device can thus be realized in a cost-effective and compact construction. The trolley can have a cable winch or a crane winch for lifting loads.

According to a further refinement of the offshore wind turbine, the loading opening is closeable with a flap. The interior space can thus be protected from weather conditions.

The flap can be fastened to the tower so as to be pivotable outward, and therefore the flap in an open position forms a loading platform projecting over an outer circumferential surface of the supporting structure. The loading platform can serve as a service platform or work platform which is provided for loading big bags, containers with a tool or service appliances from a service boat for the offshore wind turbine.

It can be provided that in the completely assembled state of the offshore wind turbine, the lifting device is arranged at a height of 5 m to 10 m above the lowest tidal water level, as viewed along the vertical extent of the supporting structure. The comparatively low arrangement of the lifting device enables rapid loading of big bags, containers with a tool or service appliances from a service boat for the wind turbine.

The access opening can be assigned a baffle plate set back inward in relation to the access opening into the interior space. Said baffle plate can be provided to at least partially absorb the energy of occurring waves in order to protect an inner wall of the supporting structure or internal lines or cable harnesses.

The access opening can be assigned a ledge or step which can be reached via an external ladder and facilitates access for people. The ledge or step can be arranged externally.

A door for opening and closing the access opening can be provided in order to protect the interior space from weather conditions.

According to a further refinement of the offshore wind turbine, it is provided that in the completely assembled state of the offshore wind turbine, the access opening is arranged 15 m or less above the lowest tidal water level, as viewed along the vertical extent of the supporting structure.

According to a further refinement of the offshore wind turbine, it can be provided that no external work platform is arranged at a height of 15 m or more above the lowest tidal water level and below a lower rotor passage of the rotor, as viewed along the vertical extent of the supporting structure. The omission of an external work platform in this region makes it possible to reduce the overall height of the offshore wind turbine as a whole. The lower passage of rotor blade tips of the rotor can thus be arranged lower and is not predetermined by the arrangement of an external work platform.

In the completely assembled state of the offshore wind turbine, the means of ascent can be arranged at least in sections 15 m or less above the lowermost tidal water level, as viewed along the vertical extent of the supporting structure. The means of ascent arranged in the interior space permits comfortable access of people to higher tower regions without being exposed to weather conditions.

It can be provided that no external means of ascent, such as a ladder, a staircase or the like, is arranged between the access opening and the loading opening, as viewed along the vertical extent of the supporting structure, in order to reduce the wave resistance. In other words, a means of ascent between the access opening and the loading opening can be arranged exclusively in the interior space.

According to a further refinement of the offshore wind turbine, it is provided that, in the completely assembled state of the offshore wind turbine, the access opening is spaced apart 5 m or more from a lower passage of rotor tips of the rotor, as viewed along the vertical extent of the supporting structure.

According to a further refinement of the offshore wind turbine, it is provided that in the completely assembled state of the offshore wind turbine, the access opening is arranged 10 m or less above the lowest tidal water level, in particular is arranged 5 m or less above the lowest tidal water level, as viewed along the vertical extent of the supporting structure. This distance relates in particular to the distance of a lower edge of the access opening from the lowermost tidal water level.

According to a further refinement of the offshore wind turbine, it is provided that in the completely assembled state of the offshore wind turbine, the means of ascent is arranged at least in sections 10 m or less above the lowest tidal water level, in particular is arranged 5 m or less above the lowest tidal water level, as viewed along the vertical extent of the supporting structure.

According to a further refinement of the offshore wind turbine, it is provided that in the completely assembled state of the offshore wind turbine, the access opening is spaced apart 10 m or more from a lower passage of rotor tips of the rotor, in particular is spaced apart 15 m or more from a lower passage of rotor tips of the rotor, as viewed along the vertical extent of the supporting structure. Comfortable access to the interior space can thus be provided.

According to a further refinement, the supporting structure of the offshore wind turbine has a transition piece, wherein the transition piece is arranged between the tower and the foundation structure, as viewed along the vertical extent of the supporting structure, wherein the transition piece connects the foundation structure to the tower, and wherein the access opening is provided on the transition piece.

BRIEF DESCRIPTION OF THE DRAWINGS

The invention will be described in more detail below with reference to a drawing illustrating exemplary embodiments. In the drawings, in each case schematically.

DETAILED DESCRIPTION

Figure 1:
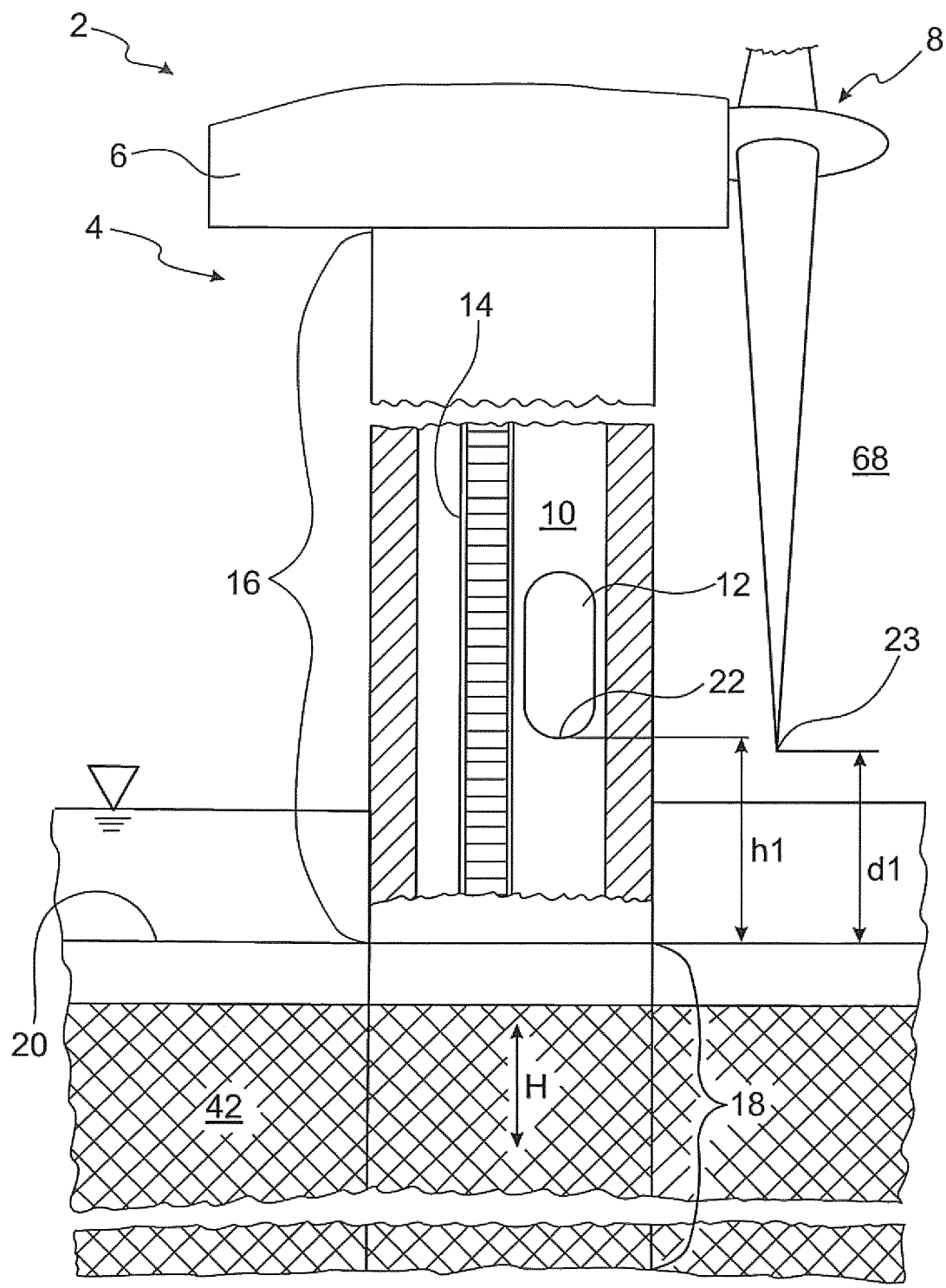
FIG. 1 shows an offshore wind turbine according to the invention.

FIG. 1 shows an offshore wind turbine 2. The offshore wind turbine 2 has a supporting structure 4, a nacelle 6, a rotor 8, an interior space 10 and an access opening 12. Furthermore, the offshore wind turbine 2 has a means of ascent 14. The means of ascent 14 is a ladder 14.

The supporting structure 4 has a tower 16 and a foundation structure 18. The tower 16 bears the nacelle 6 and the rotor 8. The access opening 12 is configured as an access for people to the interior space 10. The means of ascent 14 is arranged in the interior space 10. The means of ascent 14 is assigned to the access opening 12. One or more people can access the means of ascent 14 via the access opening 12.

No external work platform is arranged between the foundation structure 18 and the access opening 12, as viewed along a vertical extent H of the supporting structure 4. The foundation structure is configured here as a monopile.

In the completely assembled state, illustrated here, of the offshore wind turbine 2, the access opening 12 is arranged less than 15 m above the lowest tidal water level 20, as viewed along the vertical extent H of the supporting structure 4. The distance h1 between the lower edge 22 of the access opening 12 and the lowest tidal water level 20, as measured along the vertical extent H of the supporting structure 4, is therefore less than 15 m here.

As can furthermore be gathered from FIG. 1, the means of ascent 14 not only extends above the access opening 12, but, in the completely assembled state of the offshore wind turbine 2, is arranged at least in sections 15 m or less above the lowest tidal water level 12, as viewed along the vertical extent H of the supporting structure 4. In other words, the means of ascent 14 also extends between the lower edge 22 of the access opening 12 and the lowest tidal water level 20. The means of ascent 14 extends here in the interior 10 as far as and into the foundation structure 18.

In FIG. 1, the tower 16 is illustrated shortened by an interrupted section along the vertical extent H. It goes without saying that the lower passage of the rotor tip 23 is at a greater distance d1 from the lowest tidal water level 20 than the lower edge 22 of the access opening 12. The distance d1 is therefore greater than the distance h1.

Figure 2:
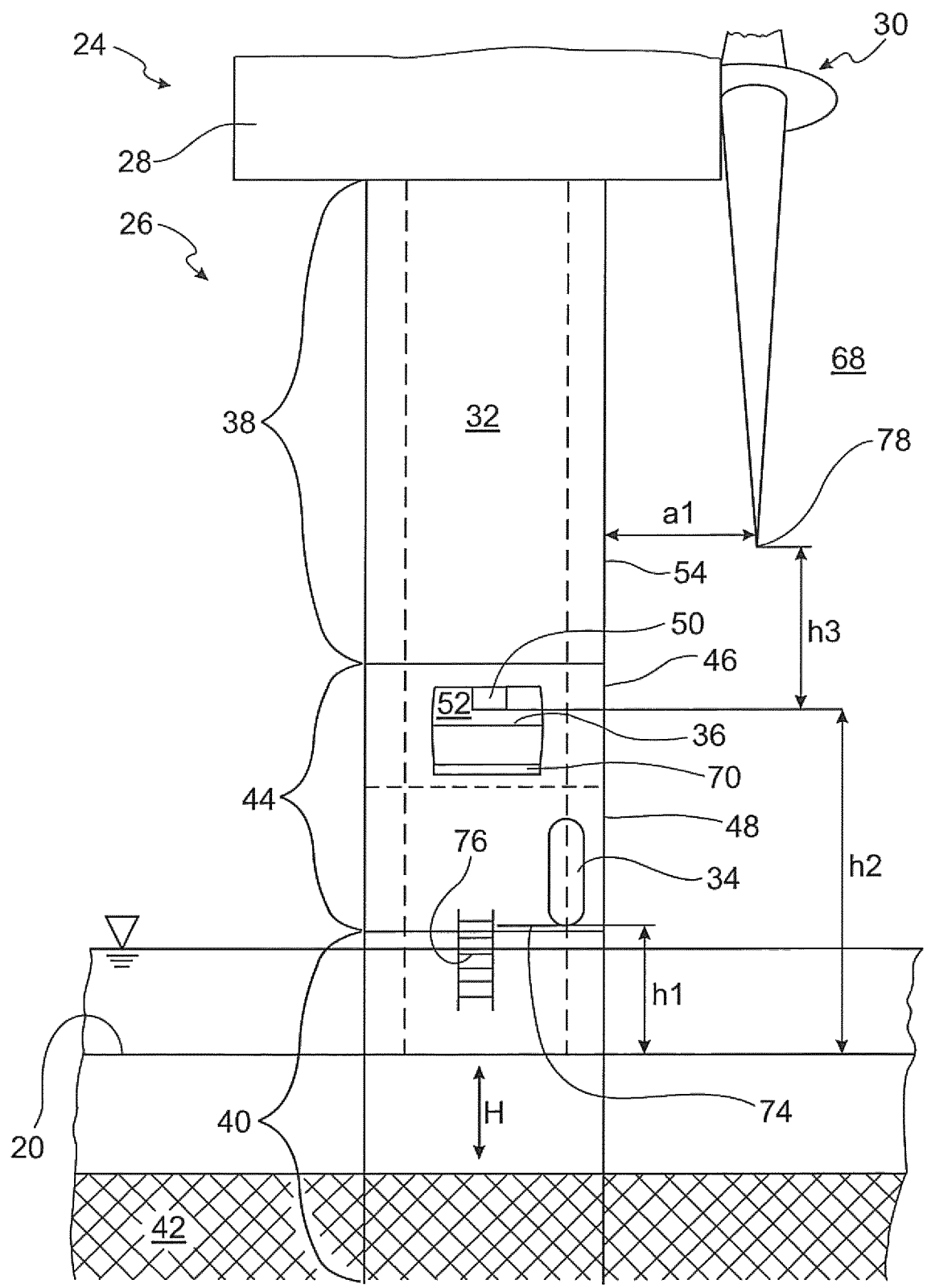
FIG. 2 shows a further offshore wind turbine according to the invention.

FIG. 2 shows an offshore wind turbine 24 having a supporting structure 26, having a nacelle 28, having a rotor 30, and having an interior space 32. The offshore wind turbine 24 has an access opening 34, and a means of ascent 36 which is in the form here of a staircase.

The supporting structure 26 has a tower 38 and a foundation structure 40. The tower 38 supports the nacelle 28 and the rotor 30. The access opening 34 is configured as an access for people to the interior space 32. The means of ascent 36 is arranged in the interior space 32. The means of ascent 36 is assigned to the access opening 34, and therefore the means of ascent 36 can be accessed by a person from the access opening 34.

No external work platform is arranged between the foundation structure 40 and the access opening 34, as viewed along the vertical extent H of the supporting structure 26. In the completely assembled state of the offshore wind turbine 24, the access opening 34 is arranged 5 m or less above the lowest tidal water level 20, as viewed along the vertical extent H of the supporting structure 26. The distance h1 measured along the vertical extent H of the supporting structure 26 is therefore less than 5 m here.

The foundation structure 40 serves for anchoring the offshore wind turbine 24 in the seabed 42, the seabed 42 being illustrated here by cross hatching.

Figure 3:
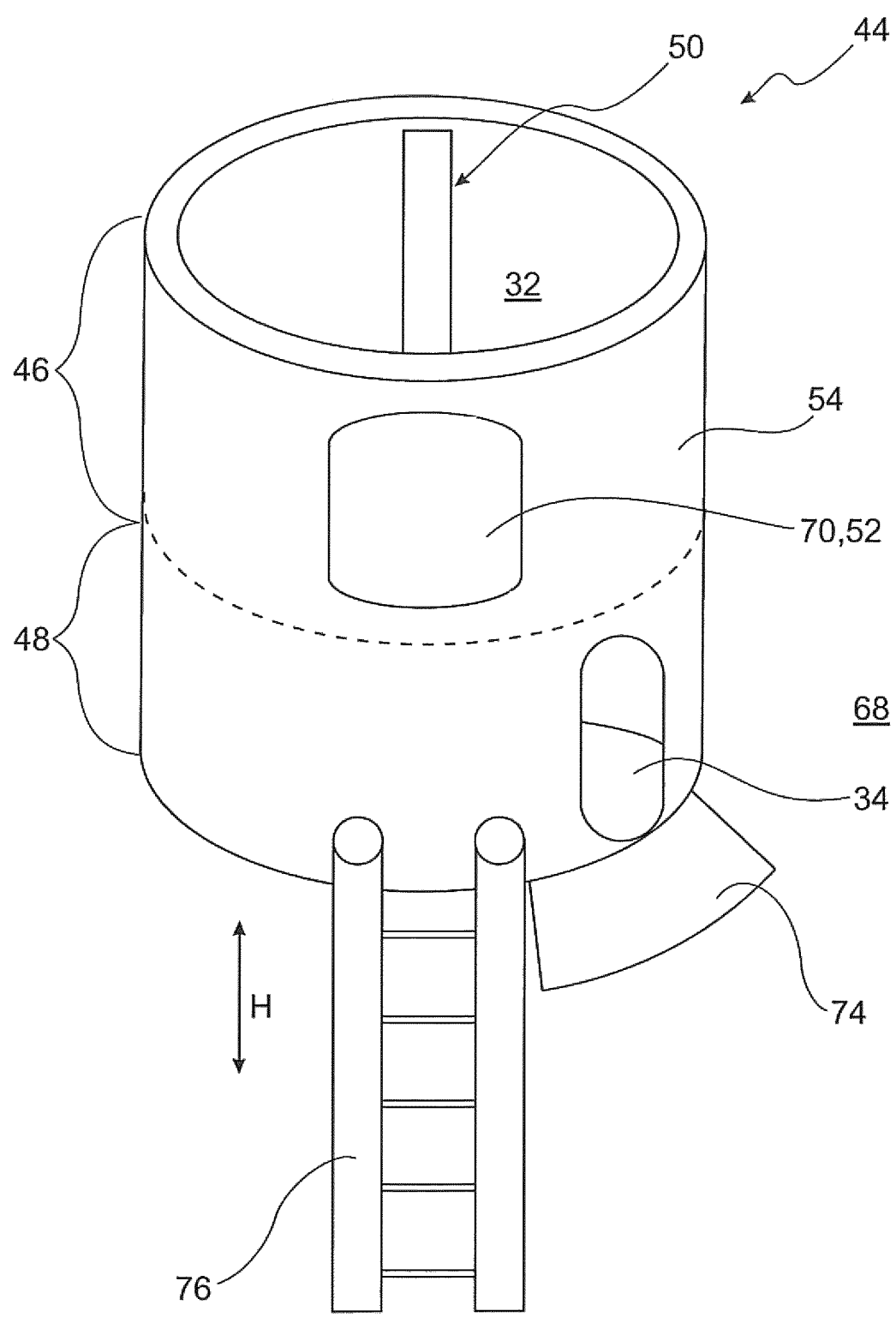
FIG. 3 shows part of a supporting structure of the wind turbine from FIG. 2 in a perspective view.
Figure 5:
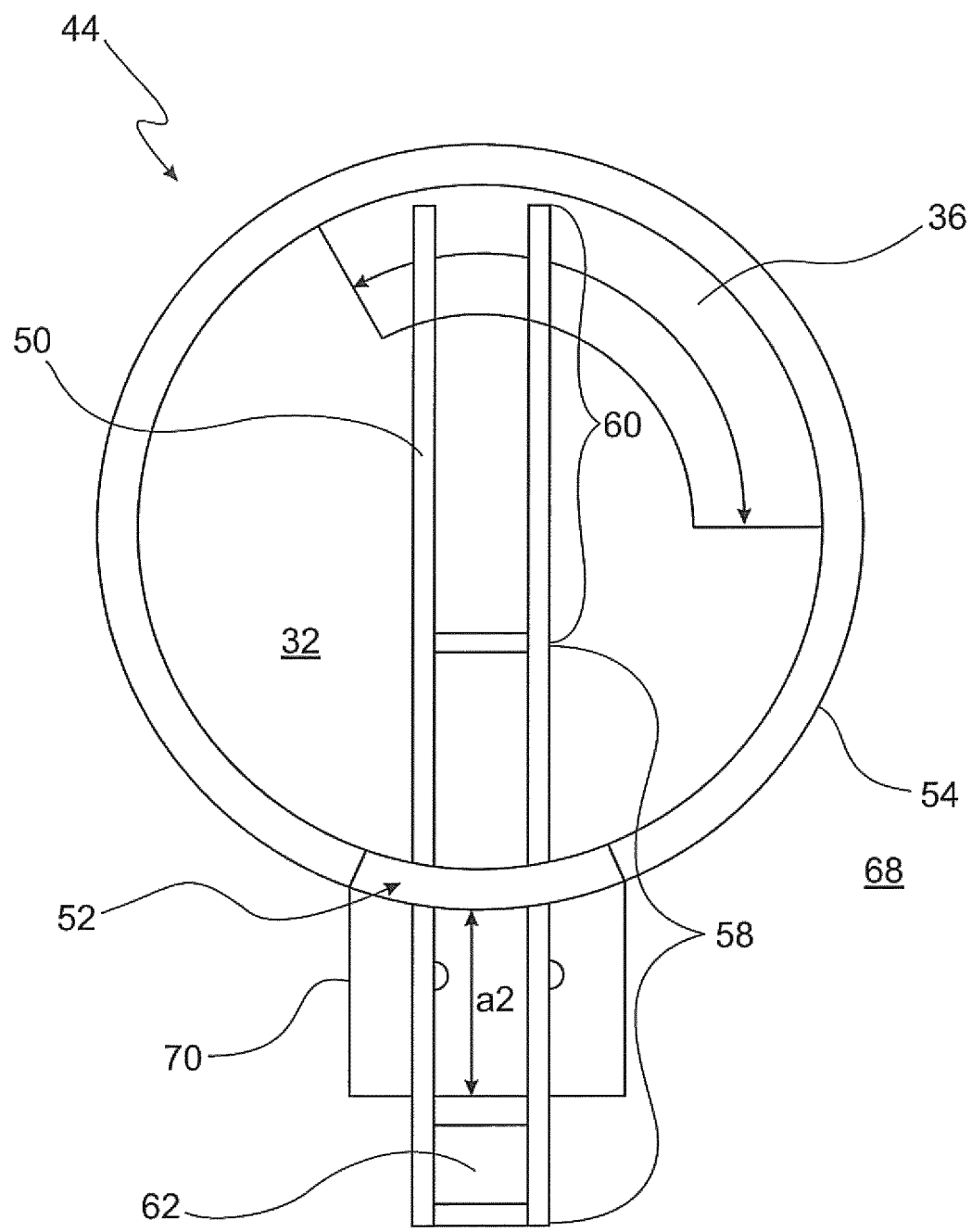
FIG. 5 shows the part of the supporting structure from FIG. 3 of top view.
Figure 6:
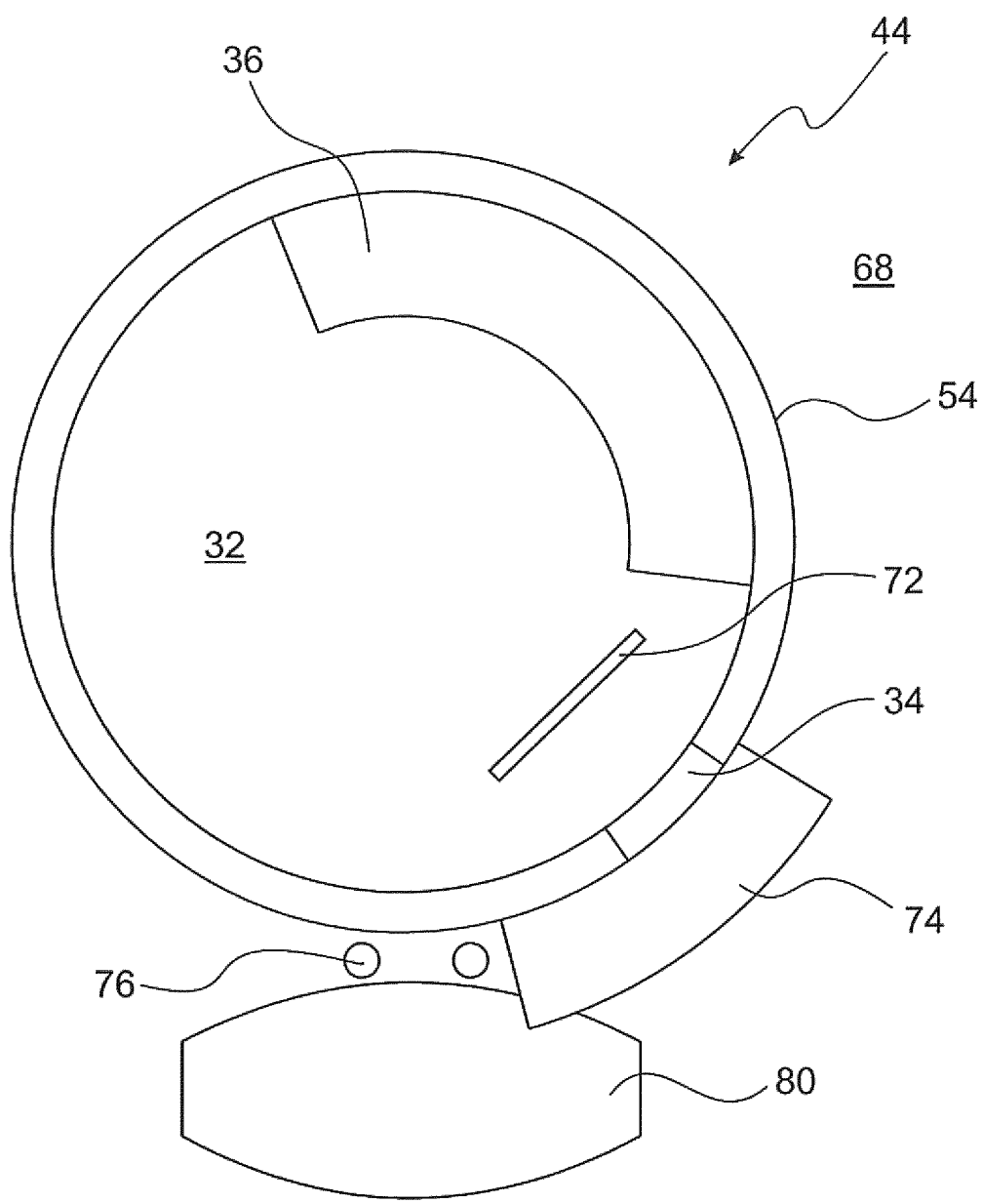
FIG. 6 shows the part of the supporting structure from FIG. 3 in a sectional illustration.

The offshore wind turbine 24 has a transition piece 44. The transition piece 44 is arranged between the tower 38 and the foundation structure 40, as viewed along the vertical extent H of the supporting structure 26. The transition piece 44 connects the foundation structure 40 to the tower 38. The access opening 34 is provided on the transition piece 44. The transition piece 44 according to FIG. 2 will be described in more detail below with reference to FIGS. 3, 4, 5 and 6. FIG. 3 shows the transition piece 44 in a perspective view from above. The transition piece 44 is assembled from an upper segment 46 (FIG. 5) and a lower segment 48 (FIG. 6).

Figure 4:
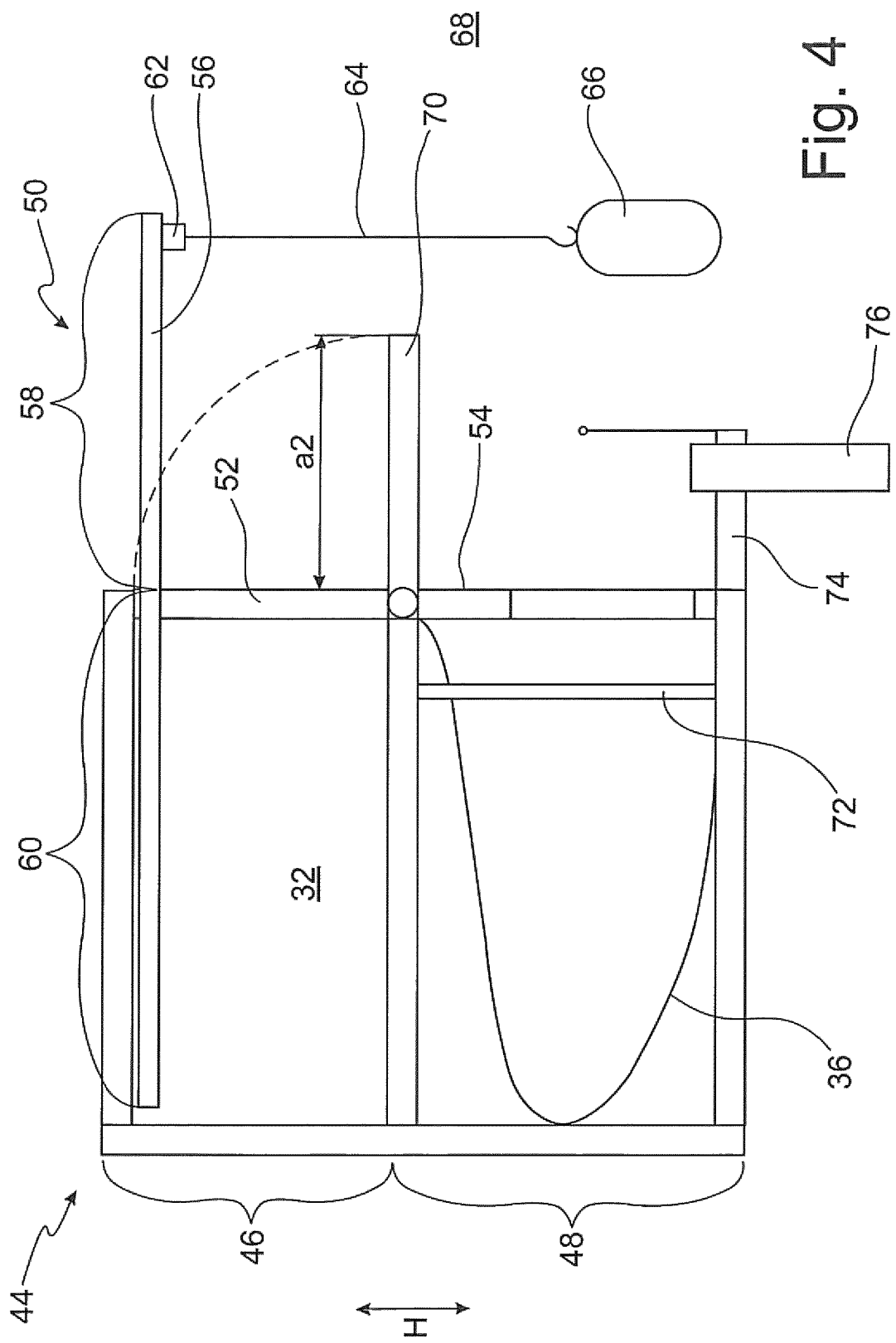
FIG. 4 shows the part of a supporting structure of the wind turbine from FIG. 3 in a longitudnal section.

The transition piece 44 has a lifting device 50 and a loading opening 52 which are provided on the upper segment 46 of the transition piece 44 (FIG. 4). The lifting device 50 and the loading opening 52 are arranged between the access opening 34 and the nacelle 28 of the offshore wind turbine 24, as viewed along the vertical extent H (FIG. 2). The lifting device 50 is assigned to the loading opening 52, and therefore tools or other transported items, such as, for example, what are referred to as big bags, can be supplied to the loading opening 52 via the lever device 50.

In a first position, the lever device 50 is completely accommodated in the interior space 32, as illustrated in FIG. 3. In the second position, the lifting device 50 extends in the region of the loading opening 2 so as to project at least in sections over an outer circumferential surface 54 of the supporting structure 26.

The lifting device 50 has a cantilever 56 which is formed from two mutually displaceable profiles 58, 60. The profile 58 can be pushed into the profile 60, and therefore the profile 58 is accommodated in the profile 60.

The lifting device 50 has a trolley 62. The trolley 62 is provided for the mounting of a hoist 64. The trolley 62 comprises a crane winch which is provided for lifting loads 66.

As already explained above, the cantilever 56 is extendable out of the interior space 32 such that the cantilever 56 is extended over the outer circumferential surface 54 of the supporting structure 26. In the second position (FIG. 4), the cantilever 56 therefore projects from the interior space 32 into the surroundings 68.

No external means of ascent, such as a ladder, a staircase or the like, is arranged between the access opening 34 and the loading opening 52, as viewed along the vertical extent H of the transition piece 44. The loading opening 52 can therefore only be reached by people via the means of ascent 36.

The loading opening 52 is closeable with a flap 70. The flap 70 is fastened to the transition piece 44 so as to be pivotable outward toward the surroundings 68. In an open position (FIG. 2, FIG. 4, FIG. 5), the flap 70 is arranged projecting over the outer circumferential surface 54 of the supporting structure 26.

In the present example, the height h1 is less than 5 m. In the completely assembled state of the offshore wind turbine 24, the lifting device 50 is arranged at a height h2 above the lowest tidal water level 20, wherein the height h2 is less than 10 m.

The access opening 34 is assigned a baffle plate 72. The baffle plate 72 is arranged set back in relation to the access opening 34 into the interior space 32. The access opening 34 is assigned a ledge 74. The access opening 34 can be reached via an external ladder 76. According to further refinements, it can be provided that the access opening 34 is closed by a door.

In the completely assembled state of the offshore wind turbine 24, the access opening 34 is spaced apart approx. 5 m from a lower passage of rotor tips 78 of the rotor 30, as viewed along the vertical extent H of the supporting structure 26. The distance h3 is therefore approx. 5 m.

No external work platform is arranged at a height of 10 m or more above the lowest tidal water level 20 and below a lower rotor passage 78 of the rotor 30, as viewed along the vertical extent H of the supporting structure 26.

The distance a1 between the outer circumferential surface 54 and the rotor tip 78 is greater than the projecting length a2 of the flap 70.

FIG. 6 furthermore shows a service boat 80 which can be positioned in the region of the ladder 76 for the transport of people.

REFERENCE SIGNS

2 Offshore wind turbine
4 Supporting structure
6 Nacelle
8 Rotor
10 Interior space
12 Access opening
14 Means of ascent, ladder
16 Tower
18 Foundation structure
20 Lowest tidal water level (LAT; LTW)
22 Lower edge of the access opening 12
23 Rotor tip, lower passage
24 Offshore wind turbine
26 Supporting structure
28 Nacelle
30 Rotor
32 Interior space
34 Access opening
36 Means of ascent, staircase
38 Tower
40 Foundation structure
42 Seabed
44 Transition piece
46 Upper segment of the transition piece 44
48 Lower segment of the transition piece 44
50 Lifting device
52 Loading opening
54 Outer circumferential surface of the tower 38
56 Cantilever
58 Profile
60 Profile
62 Trolley
64 Hoist
66 Load
68 Surroundings
70 Flap, loading platform
72 Baffle plate
74 Ledge
76 Ladder
78 Rotor tip, lower passage
80 Service boat
H Vertical extent
h1 Distance
d1 Distance
h2 Distance
h3 Distance
a1 Distance
a2 Projecting length

What is claimed is:

1. An offshore wind turbine, comprising:
a supporting structure;
a nacelle;
a rotor;
an interior space;
at least one access opening; and
an apparatus for ascent, such as a ladder or a staircase,
wherein the supporting structure has a tower and a foundation structure,
wherein the tower supports the nacelle and the rotor,
wherein the access opening is an access for people to the interior space,
wherein the apparatus for ascent is arranged in the interior space,
wherein the apparatus for ascent is assigned to the access opening, and
wherein no external work platform is arranged between the foundation structure and the access opening, as viewed along a vertical extent of the supporting structure,
a lifting device; and
a loading opening,
wherein the lifting device is assigned to the loading opening, wherein the lifting device is movable from a first into a second position, and
wherein, in the first position, the lifting device is completely accommodated in the interior space.

2. The offshore wind turbine as claimed in claim 1, wherein the lifting device and the loading opening are arranged between the access opening and the nacelle, as viewed along the vertical extent, and
wherein, in the second position, the lifting device is extended in the region of the loading opening so as to project at least in sections over an outer circumferential surface of the supporting structure.

3. The offshore wind turbine as claimed in claim 2, wherein no external apparatus for ascent, such as a ladder or a staircase, is arranged between the access opening and the loading opening, as viewed along the vertical extent of the supporting structure.

4. The offshore wind turbine as claimed in claim 2, wherein the lifting device has a trolley and a cantilever, wherein the trolley is provided for the mounting of a hoist or of loads and is displaceable along the cantilever, and
wherein the cantilever is movable at least in sections out of the interior space, and therefore the cantilever is extended so as to project at least in sections over an outer circumferential surface of the supporting structure.

5. The offshore wind turbine as claimed in claim 2, wherein the loading opening is closable with a flap, and
wherein the flap is fastened to the supporting structure so as to be pivotable outward, and therefore the flap in an open position forms a loading platform projecting over an outer circumferential surface of the supporting structure.

6. The offshore wind turbine as claimed in claim 2, wherein, in the completely assembled state of the offshore wind turbine, the lifting device is arranged at a height of 5 m to 10 m above the lowest tidal water level, as viewed along the vertical extent of the supporting structure.

7. The offshore wind turbine as claimed in claim 1, wherein the access opening is assigned a baffle plate which is set back inward in relation to the access opening into the interior space, and
wherein the access opening is assigned a ledge which can be reached via a ladder located outside the foundation structure, and
wherein a door for opening and closing the access opening is provided.

8. The offshore wind turbine as claimed in claim 1, wherein, in the completely assembled state of the offshore wind turbine, the access opening is arranged 15 m or less above the lowest tidal water level, as viewed along the vertical extent of the supporting structure, and in the completely assembled state of the offshore wind turbine, the apparatus for ascent is arranged at least in sections 15 m or less above the lowest tidal water level, as viewed along the vertical extent of the supporting structure, and wherein, in the completely assembled state of the offshore wind turbine, the access opening is spaced apart 5 m or more from a lower passage of rotor tips of the rotor, as viewed along the vertical extent of the supporting structure, and wherein, in the completely assembled state of the offshore wind turbine, no external work platform is arranged at a height of 15 m or more, in particular 10 m or more, above the lowest tidal water level and below a lower rotor passage of the rotor, as viewed along the vertical extent of the supporting structure.

9. The offshore wind turbine as claimed in claim 8, wherein, in the completely assembled state of the offshore wind turbine, the access opening is arranged 10 m or less above the lowest tidal water level, as viewed along the vertical extent of the supporting structure, and wherein, in the completely assembled state of the offshore wind turbine, the apparatus for ascent is arranged at least in sections 10 m or less above the lowest tidal water level, as viewed along the vertical extent of the supporting structure, and wherein, in the completely assembled state of the offshore wind turbine, the access opening is spaced apart 10 m or more from a lower passage of rotor tips of the rotor, as viewed along the vertical extent of the supporting structure.

10. The offshore wind turbine as claimed in claim 9, wherein, in the completely assembled state of the offshore wind turbine, the access opening is arranged 5 m or less above the lowest tidal water level, as viewed along the vertical extent of the supporting structure, and wherein, in the completely assembled state of the offshore wind turbine, the apparatus for ascent is arranged at least in sections 5 m or less above the lowest tidal water level, as viewed along the vertical extent of the supporting structure, and wherein, in the completely assembled state of the offshore wind turbine, the access opening is spaced apart 15 m or more from a lower passage of rotor tips of the rotor, as viewed along the vertical extent of the supporting structure.

11. The offshore wind turbine as claimed in claim 1, wherein the supporting structure has a transition piece, wherein the transition piece is arranged between the tower and the foundation structure, as viewed along the vertical extent of the supporting structure, wherein the transition piece connects the foundation structure to the tower, and wherein the access opening is provided on the transition piece.

* * * * *